United States Patent Office 3,320,029
Patented May 16, 1967

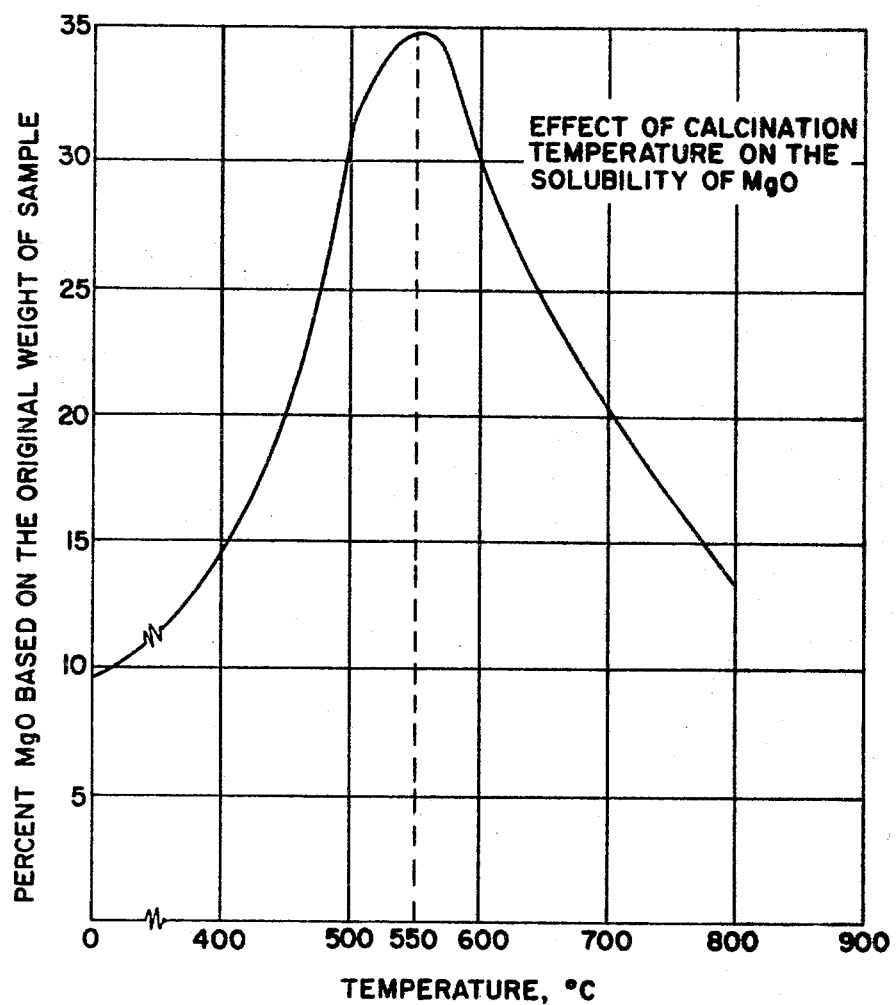

3,320,029
METHOD OF PREPARING MAGNESIA
Mark F. Adams, Pullman, Wash., assignor to Northwest Magnesite Company, Pittsburgh, Pa., a corporation of Washington
Filed Dec. 21, 1964, Ser. No. 419,708
9 Claims. (Cl. 23—201)

This invention relates to a process of producing high purity magnesia and to the resulting product. In another aspect, it relates to a novel process which can be used to treat what previously has been considered a waste material, as well as other materials, to produce a unique and useful low density, high purity magnesia.

In almost any commercial treatment of the progenitor ores of magnesia (MgO), such as magnesite ($MgCO_3$), to obtain a dead burned, dense, and highly crystalline, periclase material for use in the refractories and metallurgical industries, considerable amounts of very fine dust are inherently produced. Conventionally, the progenitor ores are rough crushed or fine crushed and slurried and fed through a rotary kiln (or, with a briquetting step, to a shaft kiln) to produce the desired dense dead burned periclase product. Thus, extension dust collector systems are incorporated in the process systems. The material from these collector systems has, in many instances, been considered unsuitable for reintroduction for dead-burning treatment and, thus, has been wasted. Over years of operation of some plants, enormous piles or dumps of this dust collector material have accumulated.

The existence and buildup of this waste material has been distressing to plant operators for many reasons. For example, the acreage required for the waste piles is lost to profitable development and use. Also, some of this waste material has a very high MgO content, i.e., 50 to 60%, by weight on an oxide basis. From 40 to 50%, by weight of the material is "available MgO," i.e., it can be recovered by the process of this invention. Means to recover and profitably utilize this potential source of magnesia product has been elusive. Accordingly, it is a primary object of this invention to provide a means of treating such waste dump material of magnesite dead burning operations to recover a unique and useful magnesia product. It is another object of the invention to provide a process of producing low density, high purity magnesia. Still another object of the invention is to provide a unique, low density, high purity magnesia.

It is thought a definition of terms is essential for a better understanding of this invention.

(1) *Magnesite or magnesia.*—In the refractories art, these terms are used interchangeably. It is, of course, a misnomer to apply the term "magnesite" to the oxide product, magnesia. In this specification, "magnesia" means the oxide of magnesium, MgO.

(2) *Dead burned magnesite or magnesia.*—To the refractories art, these terms are used interchangeably to describe the dense, highly crystalline, periclase product of good stability, which is used to fabricate refractory brick and the like.

(3) *Calcined and calcination.*—In the refractories art, these terms are normally used in relation to a so-called "caustic" calcining process. For example, calcined magnesia, to the refractories art, describes a material which has been heated to a sufficient temperature for a long enough period of time to drive off all free and substantially all chemically combined water and $CO_2$. It is fairly reactive and considerably more reactive than the practically inert dead burned product.

(4) *Calcined active magnesia.*—This is terminology used in this application to describe a product which has been heated to a temperature much lower than that required for the manufacture of "caustic" calcined magnesia. This active magnesia has many unique properties, which are discussed hereafter, and which are not found in "caustic" calcined magnesia or in dead burned magnesia.

(5) *Very finely divided.*—When this language is used to describe the product of the process of this application, it means substantially all less than 44 microns. Usually it is substantially free of sub-micron-size particles. By substantially free, it is meant to infer at least about 90% of the material is greater than 1 and less than 44 microns in size.

(6) *Low density.*—When this language is used to describe the product of present invention, it infers a density on the order of about 6.5 p.c.f. (pounds per cubic foot) to about 12.5 p.c.f. In comparison, the dead burned magnesite or magnesia, mentioned above, has a density normally over 180 p.c.f.

(7) *High purity.*—This terminology, when used to describe the product of this invention, means at least about 97% MgO, by weight on an oxide basis, and usually over 98% MgO on the same basis.

(8) *Weathered.*—This terminology, when used to describe the feed material to the process of this invention, is intended to infer that the material in question has been exposed to the atmosphere for a rather extensive period of time. For example, some of the material, which has been treated by the process of this invention, has resided in a waste pile in the State of Washington, exposed to the snow, rain, and temperature changes normally associated with that state for over ten years.

Briefly, according to one aspect of this invention, there is provided a process for the treatment of weathered flue dust, recovered from dust collectors associated with the dead burning of the progenitor ores of magnesia. This weathered flue dust preferably is first subjected to gentle mulling (it is quite friable) to loosen and separate agglomerates of the material. The mulled material, which is substantially all less than 44 microns, is subjected to an initial active calcination. This calcination is carried out at a temperature of more than 450° C. and less than 700° C. and, preferably, in the range 500 to 600° C. The material is held at this temperature for at least about 10 minutes to on the order of about 1 hour. Alternatively, the material may be "flash" calcined, i.e., 2 to 5 minutes at 750° C. After cooling, the active calcined material is again subjected to a mulling treatment, if necessary.

The single sheet of drawings graphically illustrates the effect of the calcination temperature on the solubility of MgO. This drawing is a plot of calcination temperature vs. the percentage of MgO on an oxide basis which was present in the original sample.

The actively calcined mulled material is nevt subjected to a leaching treatment to dissolve the MgO values in a saturated aqueous solution of the feed material. In a continuous operation, there is constant feed of new material, stripping off of gangue, makeup of water, and, of course, recovery of product. The saturated solution is subjected to conditions of such as mechanical agitation to assure intimate contact between feed and solution, and with $CO_2$ gas which is introduced to the system and held at a temperature in the range 15 to 25° C. In a batch operation, the agitation and $CO_2$ gas treatment ranges from at least 5 to about 30 minutes. It can be longer if one desires, but economic considerations based on lower yield per unit of continued treatment time makes 30 minutes about the maximum desirable. In the continuous operation, the residence time of a given unit of active calcined feed material will, thus, be between 5 and 30 minutes. This period of treatment time obtains from 78% (5 minutes) to 98% (30 minutes) recovery or leaching of the available MgO values from the feed.

The desired concentration of dissolved MgO for the leach treatment, in order to maintain the necessary solution for precipitation in a subsequent step, is about 20 to 22 grams of MgO per liter. 15 to 25 grams per liter is operational. Allowable concentration of solids in the leach system is 18 to 30 grams per liter, with the desired range being 27 to 29 grams per liter. Stated another way, for every 1.22 grams of solid in the system and one gram of MgO in the solution, one must introduce 2.22 grams of feed for treatment to proceed.

The product value of the leaching treatment is recovered in a supernatant or effluent liquid. The value in the liquid is probably ionized magnesium bicarbonate ($Mg(HCO_3)_2$). This liquid is treated to precipitate the basic magnesium carbonate. For example, the liquid is boiled as by treating with steam or hot gases from the active calcination stage for at least about 10 minutes for removery of about 75% to on the order of 20 minutes for 97% recovery. The material, which is precipitated and recovered from this boiling treatment, is partially hydrated magnesium carbonate. Its chemical content may be expressed roughly as $(MgO)_x \cdot (CO_2)_y \cdot (H_2O)_n$, wherein $n$ indicates a flexible number of moles of water per unit weight and in which $x$ and $y$ are integers and $x$ is larger than $y$. When operating within preferred and desired treatment parameters, as noted above, a weight unit of the precipitate of the boiling stage is about 12.5% MgO, 15% $Co_2$ with water constituting the remainder (all parts by weight).

The partially hydrated magnesium carbonate is then dried at a temperature on the order of about 200 to 250° F. to obtain a light, fluffy, still partially hydrated magnesium carbonate powder having a density on the order of about 6.5 p.c.f., and characterized by discrete and finely divided particles. The partially hydrated magnesium carbonate is about 98.8% pure. These exemplary figures are based on an initial feed material having about 57% MgO, by weight on the basis of an oxide analysis, about 85% by weight is available. It has been calculated that the result of the drying stage is a basic magnesium carbonate containing on the order of about 10% water.

Further active calcination, in the range 450 to less than 700° C. preferably in the range 500 to 600° C. with optimum results at 550° C., produces a low density, high purity, magnesia product. Of course, this drying and second active calcination can be carried out as a single treatment step.

This product has many uses. For example, it can be used as a lightweight filler for asphalt which is used in paving, roofing, and water proofing. It can be used in making a magnesium oxide cement for fabricating lightweight wallboard having insulating properties. It has potential as a soil supplement, particularly in orchard areas. The product carbonate is useful, for example, in rubber manufacture.

In the following discussion, the separation treatment steps are considered in more detail, to assist in a better understanding of the process of this invention.

Initial active calcination

As established by the drawing, the optimum calcination temperature is at 550° C., with sharp decrease in available magnesia values with higher and lower temperatures. However, there is more than just availability of MgO that requires careful control of the active calcination. There are a number of minor and trace elements associated with this dust residue of the dead burning of the pregenitor ores of magnesia. The solubility of these minor constituents, in the carbon dioxide extraction system leaching step, affects the purity of the final product.

In the laboratory, semiquantitative spectrochemical analyses procedures were used to determine the effect of calcination temperature on the minor impurity constituents. For example, CaO values have a maximum solubility after heating to 800° C., and one does not wish this material—to any appreciable extent—in the high purity product of this invention.

As an alternative to the 10 minute to about one hour treatment time, preferably in the range 500 to 600° C., almost equivalent results can be obtained by what I term "flash" active calcination, which means subjecting the feed material to a temperature of 700 to 800° C. for about 2 to 5 minutes. About 750° C. is preferred. In some respects, I prefer the slower calcination, because one cannot overcalcine if one removes the material from the calcination treatment within about an hour.

The leaching step

Studies have indicated a countercurrent leaching step, using, for example, a series of interconnected flotation machines of the type used for froth flotation of various ores, is satisfactory. $CO_2$ is recovered from the calcining kiln and may be used as feed to the series of flotation vessels. Additional $CO_2$ may be recovered from the active calcination and/or final calcination. Makeup $CO_2$ is introduced to the system by the sublimation of dry ice or the like. Alternatively, pure $CO_2$ from such as dry ice sublimation may be used but this is usually not economically as feasible. Solids are recovered from the vessels and passed to a second vessel, which is a stripper tank. The solids passed to the stripper tank are in slurry form, of course, and include gangue, some solids with additional magnesium values, and liquids. In the stripper tank, preferably with additional agitation or equivalent action, and subject to additional $CO_2$, preferably recovered from the stack gases of the calcination steps, practically all residual values are recovered from the gangue. The gangue is discharged to waste. Supernatant liquid from the stripper tank is returned to the primary leaching stage. This returning liquid includes the stripped magnesian values. It can be seen, therefore, with this system it is possible to continuously add finely divided solids at a feed end of one or more of a series of leaching vessels, continuously add fresh water as necessary at the opposite solids discharge end, discharge solids to waste (or to my preferred stripping treatment) at the discharge end of the system. Saturated leach solution is recovered from the feed end.

In a preferred embodiment of the invention, the leach system is brought to a temperature of approximately 17° C. and maintained at this temperature. The system is brought to at least saturation (not preferably about 17 grams per liter) by adding the actively calcined solids. Once the degree of saturation desired is obtained, the system is maintained at equilibrium by balancing introduction of feed and liquid and discharge of solids and supernatant liquid.

The precipitation stage

Of course, the magnesian values of the supernatant liquid of the leaching step can be recovered in a variety of ways. For example, simply boiling the supernatant liquid will cause precipitation. The chemical formula of the precipitate is difficult to pinpoint, and I call it a partially hydrated magnesium hydroxide and magnesium carbonate in admixture. I have noted above that introduction of steam into a bath of the supernatant liquid is satisfactory, also.

In comparative studies on identical material, it was attempted to determine how much of the magnesia value could be recovered if the flue dust was uncalcined. Substituting this material for that used in the other testing, reported above, I recovered only about 25% of the total magnesia, as compared to the 75 to 85% recovery when it is subjected to my initial active calcination treatment. This amounts to 75 to 97 or 98% of the available MgO. When the process of this invention is practiced as a part of the dead burning treatment of progenitor ores from which the dust feed material is obtained, I suggest stripping carbon dioxide from the hot flue gases emanating from the dead burning treatment for use in the process of the present invention.

As noted above, the product of the process of this invention is on the order of 97 to 98% or more pure. The major impurity constituent remaining is calcium oxide. The $R_2O_3$ oxides $Fe_2O_3$, $Cr_2O_3$, and $Al_2O_3$ were also found to be present in trace amounts. The purity of the product can be increased to 99% or more by subjecting the solution of MgO values, before boiling, to reduced pressure in which free carbon dioxide is removed and the calcium oxide—in combination with the $R_2O_3$ and a minor amount of MgO—is precipitated. The resulting purified solution of MgO values is clarified as by allowing it to settle prior to the precipitation step.

In the Bureau of Mines Technical Paper 684, published in 1946 by H. A. Doerner et al., entitled "The Bicarbonate Process for the Production of Magnesium Oxide," the authors discuss and comment on earlier work in the general art to which this invention relates. My discoveries are contrary to their findings of requirement of relatively long calcination treatments at comparatively high temperatures with, in some instances, surprisingly low yields. I do not fully understand why my process produces such superior results at lower calcination temperatures, in shorter time intervals. I believe one explanation is that I have discovered that impurities in the feed material, when the material is reduced to 44 microns and less, synergistically buffer the desired reactions and provide much better yields, faster and/or at lower temperatures.

In the foregoing discussion, the primary emphasis has been on treatment of what has previously been considered useless waste material to obtain a unique magnesia material. It is, of course, to be understood that other feed materials could be used; for example, any natural magnesia progenitor ore, which has been sufficiently finely divided, would be a satisfactory feed. By sufficiently finely divided I prefer that substantially all particles are finer than 44 microns. Preferably, at least, 90% by weight is in the range 1 to 44 microns.

*An exemplary, schematic, flow system*

The following diagram provides a general arrangement of process steps which can be used to practice my invention:

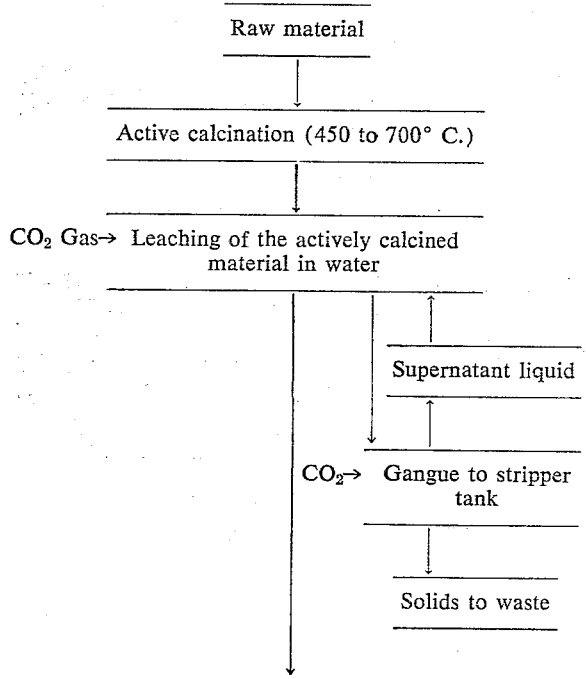

Having thus described the invention in detail and with sufficient particularity as to enable those skilled in the art to practice it, what is desired to have protected by Letters Patent is set forth in the following claims.

I claim:

1. A process of producing high purity magnesia consisting essentially of the steps of:
   (A) subjecting a feed material of the group consisting essentially of (1) the progenitor ores of magnesia, (2) flue dust recovered from the caustic calcination and dead burning of such ores, and (3) magnesium hydroxide, which feed material includes as an impurity constituent calcium oxide with a minor amount of $Al_2O_3$, $Fe_2O_3$, and $Cr_2O_3$, to a first calcination treatment in the range at least about 450° C. to less than 700° C. for from 10 minutes to 1 hour;
       said feed material all being reduced to finer than about 44 microns and;
   (B) passing the material to an aqueous solution of that material for leaching;
       (1) subjecting the aqueous solution and reduced material to intimate contact with each other and with $CO_2$ gas, while precipitating calcium oxide-impurity and $Al_2O_3$, $Fe_2O_3$, and $Cr_2O_3$ constituents,
       (2) maintaining the temperaure of the solution in the range 15 to 25° C.,
       (3) continuing the intimate contact for a period of 5 to 30 minutes to recover 78 to 98%, by weight on an oxide basis, of the available MgO values of the feed materials;
   (C) recovering a saturated liquid from the leaching step containing 15 to 25 grams of dissolved feed values per liter;
   (D) precipitating dissolved MgO values from the saturated liquid of step C by boiling it for 10 to 20 minutes;
   (E) recovering the precipitate from the foregoing step and subjecting it to a heat treatment in the range 200 to 800° C. and recovering a calcined active MgO of at least about 97% MgO, by weight on the basis of an oxide analysis.

2. The process of claim 1 in which the first calcination is at a temperature in the range 500 to 600° C.

3. The process of claim 1 in which the first calcination is at a temperature of about 550° C.

4. The process of claim 1 in which the saturated solution contains 20 to 22 gms. of dissolved feed material per liter of water.

5. The process of claim 1 in which the liquid from the leaching step is subjected to a reduced pressure for a time period sufficient to drive off entrapped $CO_2$ and precipitate CaO in combination with the $Al_2O_3$, $Fe_2O_3$, and $Cr_2O_3$ constituents and a minor amount of MgO before passing to the precipitating step.

6. A process of producing low density, high purity magnesia consisting essentially of the steps of:
   (A) subjecting a feed material of the group consisting essentially of (1) the progenitor ores of magnesia, (2) flue dust from the caustic calcination and dead burning of such ores, and (3) magnesium hydroxide, which feed material includes as an impurity constituent calcium oxide with a minor amount of $Al_2O_3$, $Fe_2O_3$, and $Cr_2O_3$, to a first calcination treatment in the range of 450° C. to less than 700° C. for from 10 minutes to 1 hour;
    said feed material being reduced to substantially all finer than 44 microns;
(B) passing the material to an aqueous solution of that material for leaching;
    (1) subjecting the aqueous solution and reduced material to mechanical agitation and contact with $CO_2$ gas, while precipitating calcium oxide-impurity and $Al_2O_3$, $Fe_2O_3$, and $Cr_2O_3$ constituents,
    (2) maintaining the temperature of the solution in the range 15 to 25° C.,
    (3) continuing the agitation and gas contact for a period of 5 to 30 minutes to recover 78 to 98%, by weight on an oxide basis, of the available MgO values of the feed material;
(C) recovering a saturated liquid from the leaching step containing 15 to 20 grams of dissolved feed values per liter;
(D) precipitating dissolved MgO values from the saturated liquid of step C by subjecting said liquid to agitation;
(E) recovering the precipitate from the foregoing step and subjecting it to a heat treatment in the range 200 to 800° C. and recovering a calcined active MgO of at least about 97% MgO, by weight on the basis of an oxide analysis.

7. A process of producing low density, high purity magnesia consisting essentially of the steps of:
(A) subjecting a feed material of the group consisting essentially of (1) the progenitor ores of magnesia, (2) flue dust recovered from the caustic calcination and dead burning of such ores, and (3) magnesium hydroxide, which feed material includes as an impurity consistent calcium oxide with a minor amount of $Al_2O_3$, $Fe_2O_3$, and $Cr_2O_3$, to a first calcination treatment at 700 to 800° C. for 2 to 5 minutes;
    (1) the feed material being reduced to a size range less than 44 microns;
(B) passing the material to an aqueous solution of that material for leaching;
    (1) subjecting the aqueous solution and reduced material to intimate contact with each other and with $CO_2$ gas while precipitating calcium oxide-impurity and $Al_2O_3$, $Fe_2O_3$, and $Cr_2O_3$ constituents,
    (2) maintaining the temperature of the solution in the range 15 to 25° C.,
    (3) continuing the intimate gas contact for a period of 5 to 30 minutes to recover 78 to 98%, by weight on an oxide basis, of the available MgO values of the feed material;
(C) recovering a liquid from the leaching step containing 15 to 25 grams of dissolved feed values per liter;
(D) subjecting the liquid from step C to a precipitation treatment and precipitating dissolved available MgO values from said liquid;
(E) recovering the precipitate from the foregoing step and subjecting it to a heat treatment in the range 200 to 800° C. and recovering a calcined active MgO of at least about 97% MgO, by weight on the basis of an oxide analysis.

8. A process of producing low density, high purity magnesia consisting essentially of the steps of:
(A) subjecting a feed material of the group consisting essentially of the progenitor ores of magnesia, flue dust from the caustic calcination and dead burning of such ores, and magnesium hydroxide, said feed material including as an impurity constituent calcium oxide with a minor amount of $Al_2O_3$, $Fe_2O_3$, and $Cr_2O_3$, a calcination treatment at 750° C. for 2 to 5 minutes;
    (1) the feed material being reduced to the size range less than 44 microns;
(B) passing the material to an aqueous solution of that material for leaching;
    (1) subjecting the aqueous solution and reduced material to intimate contact with each other and with $CO_2$ gas while precipitating calcium oxide-impurity and $Al_2O_3$, $Fe_2O_3$, and $Cr_2O_3$ constituents,
    (2) maintaining the temperature of the solution in the range 15 to 25° C.,
    (3) continuing the intimate contact for a period of 5 to 30 minutes to recover 78 to 98%, by weight on an oxide basis, of the available MgO values of the feed material;
(C) recovering a saturated liquid from the leaching step containing 15 to 25 grams of dissolved feed values per liter;
(D) subjecting the saturated liquid of step C to a precipitating stage and precipitating the dissolved MgO values from said liquid;
(E) recovering the precipitate from the foregoing step and subjecting it to a heat treatment in the range 200 to 800° C. and recovering a calcined active MgO of at least about 97% MgO, by weight on the basis of an oxide analysis.

9. A process of producing high purity magnesia consisting essentially of the steps of:
(A) subjecting a feed material consisting of a finely divided progenitor ore of magnesia which includes as an impurity constituent calcium oxide with a minor amount of $Al_2O_3$, $Fe_2O_3$, and $Cr_2O_3$ to a calcination treatment in the range 450 to less than 700° C. for from 10 minutes to 1 hour;
(B) passing the feed material to an aqueous solution of that material for leaching;
    subjecting the solution and feed material to intimate contact with each other and with $CO_2$ gas, for a time period sufficient to recover 78 to 98%, by weight on an oxide basis, of the available MgO values of the feed material;
(C) recovering a liquid from the leaching step having therein dissolved 15 to 25 grams of feed material per liter of liquid;
(D) subjecting the liquid from step C to a precipitating treatment and precipitating dissolved MgO values from said liquid;
(E) recovering the precipitate from the foregoing step and subjecting it to a heat treatment in the range 200 to 800° C. and recovering a magnesium material of at least about 97% MgO, by weight on the basis of an oxide analysis.

References Cited by the Examiner

UNITED STATES PATENTS

| | | | |
|---|---|---|---|
| 1,573,632 | 2/1926 | Crowell | 23—67 |
| 1,864,063 | 6/1932 | Greider | 23—201 |
| 2,209,752 | 7/1940 | Abrams et al. | 23—67 |
| 2,210,892 | 8/1940 | Brandenburg | 23—201 |
| 2,338,886 | 1/1944 | Vieweg et al. | 23—201 X |
| 2,462,277 | 2/1949 | Naugle | 23—201 |
| 2,519,361 | 8/1950 | Evans | 23—67 |
| 3,127,242 | 3/1964 | Cohn et al. | 23—201 |

OSCAR R. VERTIZ, *Primary Examiner.*

G. T. OZAKI, *Assistant Examiner.*